(12) United States Patent
Kain et al.

(10) Patent No.: US 8,557,118 B2
(45) Date of Patent: Oct. 15, 2013

(54) GASIFICATION GREY WATER TREATMENT SYSTEMS

(75) Inventors: James Scott Kain, Houston, TX (US); Dinh-Cuong Vuong, Sugar Land, TX (US); David Brian Fraser, Burlington (CA); Timothy Michael Pickett, Salt Lake City, UT (US)

(73) Assignee: General Electric Company, Schenectady, NY (US)

( * ) Notice: Subject to any disclaimer, the term of this patent is extended or adjusted under 35 U.S.C. 154(b) by 387 days.

(21) Appl. No.: 12/699,004

(22) Filed: Feb. 2, 2010

(65) Prior Publication Data
US 2011/0186489 A1 Aug. 4, 2011

(51) Int. Cl.
C02F 1/70 (2006.01)
(52) U.S. Cl.
USPC ........... 210/616; 210/631; 210/719; 210/721; 210/757; 210/202; 210/205
(58) Field of Classification Search
USPC ......... 210/615, 616, 631, 702, 718, 719, 721, 210/754, 756, 757, 202, 205, 150, 151, 210/199; 48/200–206, 197 A; 110/238, 343, 110/344, 346
See application file for complete search history.

(56) References Cited

U.S. PATENT DOCUMENTS

| | | | |
|---|---|---|---|
| 4,437,417 A | 3/1984 | Roberts | |
| 4,437,471 A | 3/1984 | Nelson | |
| 5,178,773 A * | 1/1993 | Kerlin et al. | 210/724 |
| 5,230,211 A * | 7/1993 | McMahon et al. | 110/346 |
| 5,925,255 A | 7/1999 | Mukhopadhyay | |
| 6,036,748 A | 3/2000 | Wallace et al. | |
| 6,183,644 B1 | 2/2001 | Adams et al. | |
| 6,228,271 B1 * | 5/2001 | Cote | 210/739 |
| 6,537,456 B2 | 3/2003 | Mukhopadhyay | |
| 7,056,487 B2 * | 6/2006 | Newby | 423/650 |
| 7,378,022 B2 | 5/2008 | Lupton et al. | |
| 7,416,668 B1 | 8/2008 | Theodore | |
| 7,550,087 B2 | 6/2009 | Peeters et al. | |
| 2007/0114174 A1* | 5/2007 | Peeters et al. | 210/631 |
| 2009/0101598 A1 | 4/2009 | Kain et al. | |
| 2009/0188867 A1 | 7/2009 | Vuong et al. | |
| 2010/0089740 A1 | 4/2010 | Vuong et al. | |

FOREIGN PATENT DOCUMENTS

| | | |
|---|---|---|
| CA | 2477333 A1 * | 2/2006 |
| CN | 101223111 | 7/2008 |
| CN | 101460412 | 6/2009 |
| PL | 130170 B | 11/1987 |
| WO | 2007012181 | 2/2007 |
| WO | 2008/027259 A2 | 3/2008 |

OTHER PUBLICATIONS

Adams, J. et al., Biotechnologies for Metal and Toxic Inorganic Removal from Mining Process and Waste Solutions, Randol Gold Forum, 1996, pp. 143-146.

(Continued)

*Primary Examiner* — Lucas Stelling
(74) *Attorney, Agent, or Firm* — Fletcher Yoder, P.C.

(57) ABSTRACT

In one embodiment, a grey water treatment system includes an oxidation reactor for oxidizing grey water. The grey water treatment system also includes a biological reduction and precipitation system with microbes designed to remove one or more target components from the oxidized grey water.

23 Claims, 3 Drawing Sheets

(56) References Cited

OTHER PUBLICATIONS

Adams, D. J., et al., Environmental Chemistry of Selenium, Bioreduction in Mining Waters, 1998, pp. 479-499.
Irvine, S., Selenium Biotreatment of Agricultural Drainage in the San Joaquin Valley, California, 2006, pp. 1-2.
Pickett, T. et al., Using Biology to Treat Selenium, Power Engineering, Nov. 2006, pp. 140-142.
Proposed EPRI Evaluation of the GE ABMet System at Duke's Belews Creek, 2009, pp. 1-7.
Sandy, T., North American Metals Council 5th White Paper—Review of Available Technologies for the Removal of Selenium from Water, North American Metals Council, Nov. 24, 2009, pp. 1-93.
Sonstegard, J. et al., ABMet® Biological Selenium Removal from FGD Wastewater, 2005, pp. 1-5.
Sonstegard, J. et al., Full Scale Implementation of GE ABMet® Biological Technology for the Removal of Selenium from FGD Wastewaters, 2007, pp. 1-6.
Sonstegard, J. et al., Full Scale Operation of GE ABMet® Biological Technology for the Removal of Selenium from FGD Wastewaters, 2008, pp. 1-11.
Van Dijen, F., Reduction of Emissions of Nitrates with FGD Wastewater, www.laborelec.com, Dec. 9, 2006, pp. 1-17.
Wahlquist, B. et al., Effective Biological Water Treatment through Biological Process Control, pp. 1-14.
Blankinship, S., Bugs Used to Treat FGD Wastewater, http://www.powergenworldwide.com, pp. 2.
Kobilnyk, T., GE Enhances Product Portfolio for Power Industry with ZENON Membrane Solutions, GE Water and Process Technologies, Nov. 27, 2006, pp. 2.
Evaluation of Duke Power Flue Gas Desulfurization Wasterwater Treatment Process, http://www.water.siemens.com, pp. 2.
Takada T et al: "Continuous Treatment of Wastewater Containing Selenium Compounds", ITE Letters on Batteries, New Technologies & Medicine, ITE-IBA Office, Brunswick, OH, US, vol. 2, No. 3-4, Dec. 1, 2009, pp. 46-51, XP001550308.
PCT Search Report issued in connection with corresponding WO Patent Application No. US11/22492 filed on Jan. 26, 2011.
Ambient Water Quality Criteria for Selenium. U.S. Environmental Protection Agency. Sep. 1987.
Basu, R. Selenium Speciation Along a Groundwater Flow Path in the Carrizo Aquifer, Southeastern Texas. University of Texas at Arlington, Aug. 2006.
Beak International Incorporated. Literature Review of Environmental Toxicity of Mercury, Cadmium, Selenium and Antimony in Metal Mining Effluents. Mar. 2002.
Brookins, D.G. Eh-pH Diagrams for Geochemistry. Springer-Verlag, Berlin. 176 p. 1988.
Faust et al. Adsorption Process for Water Treatment. Butterworths. 1987.
Faust et al. Chemistry of Water Treatment. Butterworths. 1983.
http://www.powermag.com/water/Flue-Gas-Desulfurization-Wastewater-Treatment-Primer_1739.html Mar. 2009.
Liu et al. Modeling of selenium transport at the Kesterson reservoir, California, U.S.A., Dec. 1993.
Martens, et al. Selenium Speciation of Soil/Sediment Determined with Sequential Extractions and Hudride Generation Atomic Absorption Spectrophometry. Environmental Science & Technology, vol. 31, No. 1 p. 133-139, 1997.
Toxic Metals. 13—Comtemparary issues_S11.
Willyard, C. EPRI Journal. Cleaning Mercury and Selenium from Scrubber Wastewater. Fall 2009.
CH2MHILL. Review of Available Technologies for the Removal of Selenium from Water.Jun. 2010.
Exponent. Technical Memorandum: Technical Briefing Paper on Selenium, Bellevue, WA. Jul. 2010.
Robberecht et al. Selenium in environmental waters: determination, speciation and concentration levels. Talanta. 29:823. 1982.
Selenium Management Strategies. Salton Sea SCH Project, Aug. 2011.
Faust, S.D. and O.M. Aly. Chemistry of Natural Waters, Butterworths, Boston, 1981 pp. 359-375.
Unofficial English translation of PL Search Report dated Dec. 12, 2012 from corresponding PL Application No. P-401545.
Devitt, T. et al. Flue Gas Desulfurization System Capabilities for Coal-Fired Steam Generators, vol. I and II. EPA 600/07-78-032a and b. U.S. Environmental Protection Agency, 1978.
Irvine, Scott; ABMet Treatment Technology Pilot Tests in the San Joaquin Valley; Bureau of Reclamation; Mar. 16, 2005.
Krasner, Stuart; Enhanced Coagulation and Enhanced Precipitative Softening Guidance Manual; United States Environment Protection Agency—Office of Water (4607); May 1999.
Application No. 201180016640.6, Chinese Office Action mailed Aug. 7, 2013.

* cited by examiner

GASIFICATION GREY WATER TREATMENT SYSTEMS

BACKGROUND OF THE INVENTION

The subject matter disclosed herein relates to gasification process plants for chemical production and/or to integrated gasification combined cycle (IGCC) power plants. More specifically, the disclosed embodiments relate to grey water treatment systems for treating grey water produced by gasification.

Fossil fuels, such as solid coal, liquid petroleum, or natural gas, may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns more efficiently and cleaner than the fuel in its original state. A byproduct of gasification is grey water, which may include fine particles of ash, metals, ammonia, and biodegradable organic matter. Some or all of the grey water components may be regulated by state and/or federal agencies. Accordingly, the grey water may be treated to remove less desirable components prior to discharging the grey water from the gasification system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a grey water treatment system includes an oxidation reactor configured to oxidize grey water, and a biological reduction and precipitation system that includes microbes configured to remove one or more target components from oxidized grey water.

In a second embodiment, a grey water treatment system includes an oxidation reactor configured to oxidize selenium species within grey water, and a biological reduction and precipitation system that includes microbes configured to chemically reduce and precipitate oxidized selenium species from the grey water.

In a third embodiment, a grey water treatment system includes a pretreatment system configured to remove scaling components from grey water to produce pretreated grey water. The grey water treatment system further includes a biotreatment system configured to oxidize the pretreated grey water and to remove one or more target components from oxidized pretreated grey water to produce biotreated grey water.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to grey water treatment systems that may be employed in gasification systems or integrated gasification combined cycle (IGCC) systems to treat grey water produced during gasification. The grey water treatment systems include biological reduction and precipitation biotreatment systems with microbes specially designed to remove target components from the grey water. In particular, rather than removing organic components, the microbes may be specially designed to remove target components, such as selenium, arsenic, mercury, molybdenum, nitrate, and vanadium. The microbes may remove the target components by chemically reducing and precipitating the target components. Further, the microbes may convert some of the target components into other chemical components that may be released as a gas.

The grey water treatment systems also may include pretreatment equipment, such as chemical reactors, clarifiers, and filters that remove scaling components and trace metals upstream of the biological reduction and precipitation biotreatment systems. Further, oxidation reactors may be included upstream of the biological reduction and precipitation biotreatment systems to oxidize some of the target components to allow the target components to be removed through reduction and precipitation. Moreover, post-treatment equipment, such as membrane bioreactors may be included to remove additional components from the grey water.

Figure 1:
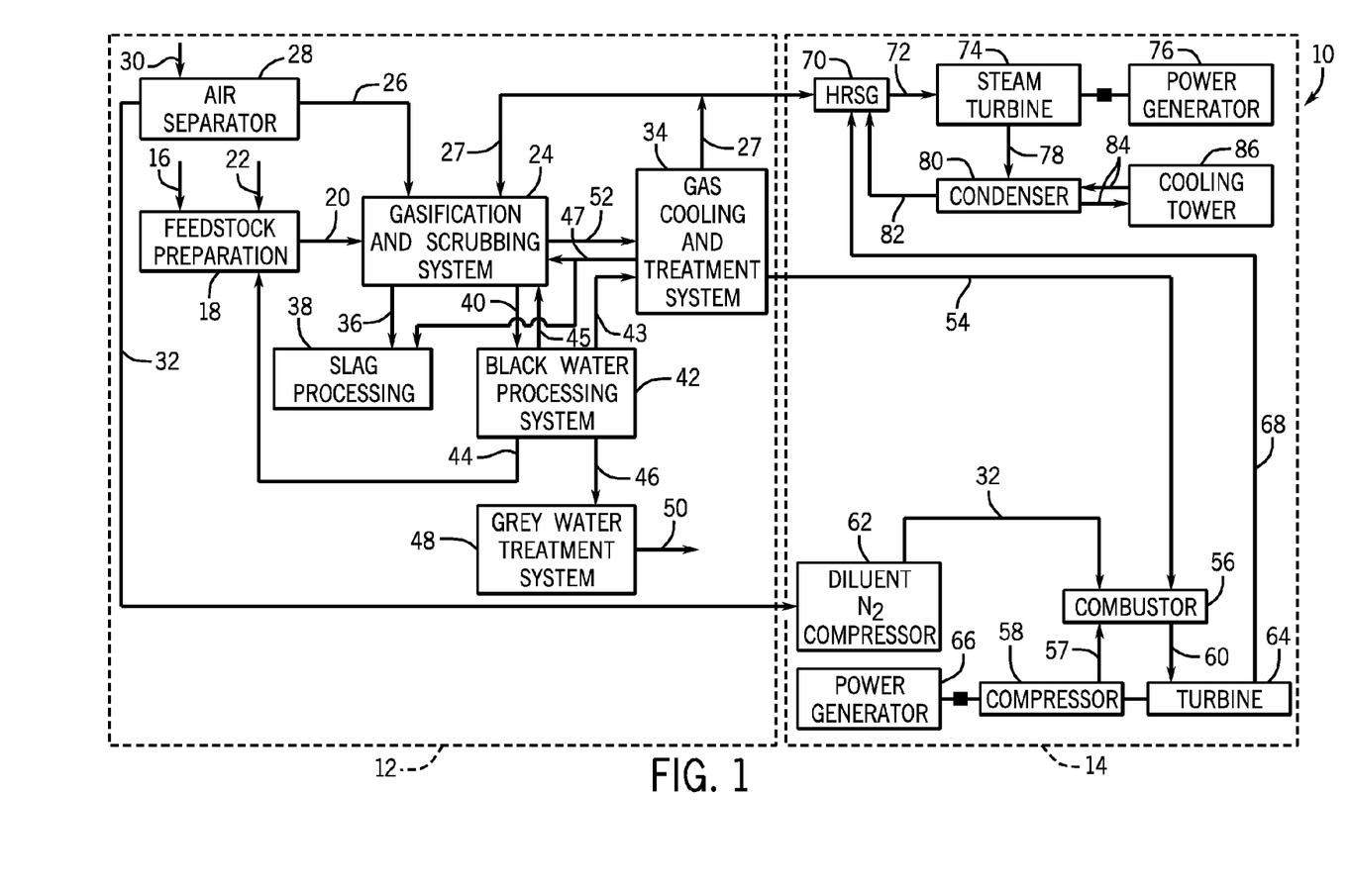
FIG. 1 is a schematic block diagram of an embodiment of an integrated gasification combined cycle system.

FIG. 1 illustrates an IGCC system 10 that may produce grey water as a byproduct of gasification. The IGCC system 10 includes a gasification system 12 integrated with a power generation system 14. Within the gasification system 12, a carbonaceous fuel source 16 may be utilized as a source of energy to produce syngas. The fuel source 16 may include coal, petroleum coke, biomass, wood-based materials, agricultural wastes, tars, coke oven gas and asphalt, or other carbon containing materials.

The fuel source 16 may be introduced into the gasification system 12 via a feedstock preparation system 18. The feedstock preparation system 18 may resize or reshape the fuel source 16, for example, by chopping, milling, shredding, pulverizing, briquetting, or palletizing the fuel source 16 to create a fuel slurry 20. According to certain embodiments, the feedstock preparation system 18 may include a grinding mill. Further, within the feedstock preparation system 18, additives 22, such as water, or other suitable liquids, may be added to the fuel source 16 to create the fuel slurry 20. However, in other embodiments, where no liquid additives are employed, the fuel slurry 20 may be a dry feedstock.

From the feedstock preparation system 18, the fuel slurry 20 may be directed to a gasification and scrubbing system 24. The gasification and scrubbing system 24 may include a gasifier where the fuel slurry 20 may be mixed with oxygen 26 and steam 27 to produce syngas. The oxygen 26 may be provided by an air separator 28 that separates air 30 into oxygen 26 and nitrogen 32. The steam 27 may be recycled within the IGCC system 10 and may be provided from a downstream gas cooling and treatment system 34.

Within the gasification and scrubbing system 24, the gasifier may react the fuel slurry 20 with a limited amount of oxygen (e.g., partial oxidation) at elevated pressures (e.g. from absolute pressures of approximately 20 bar to 85 bar) and temperatures (e.g., approximately 700° C. to 1600° C.) to partially oxidize the fuel slurry 20 and produce syngas. Due to chemical reactions between the oxygen 26, steam 27, and carbon within the fuel slurry 20, the syngas may include hydrogen, carbon monoxide, and carbon dioxide, as well as other less desirable components, such as ash, sulfur, nitrogen, and chloride, present in the carbonaceous fuel source 16.

To convert the fuel slurry 20 into syngas, the gasifier first may heat the fuel slurry 20 to undergo a pyrolysis process. According to certain embodiments, temperatures inside the gasifier 20 may range from approximately 150° C. to 700° C. during the pyrolysis process, depending on the type of fuel source 16 utilized to generate the fuel slurry 20. The heating of the fuel slurry 20 during the pyrolysis process may generate a solid, e.g., char, and residue gases, e.g., carbon monoxide, and hydrogen.

A combustion process may then occur in the gasifier. The combustion may include introducing oxygen 26 to the char and residue gases. The char and residue gases may react with the oxygen 26 to form carbon dioxide and carbon monoxide, which provides heat for the subsequent gasification reactions. According to certain embodiments, temperatures during the combustion process may range from approximately 700° C. to 1600° C. Next, steam 27 may be introduced into the gasifier during a gasification step. The char may react with the carbon dioxide and steam 27 to produce carbon monoxide and hydrogen at temperatures ranging from approximately 800° C. to 1100° C. In essence, the gasifier utilizes steam 27 and oxygen 26 to allow some of the feedstock to be "burned" to produce carbon monoxide and energy, which drives a second reaction that converts further feedstock to hydrogen and additional carbon dioxide, thereby producing syngas. The syngas may include approximately 85% of carbon monoxide and hydrogen, as well as methane, carbon dioxide, water, hydrogen chloride, hydrogen fluoride, carbonyl sulfide, ammonia, hydrogen cyanide, and hydrogen sulfide (depending on the sulfur content of the feedstock). Non-gasifiable ash material and unconverted and/or incompletely converted fuel slurry 20 may be byproducts of the process that may exist as larger particles of molten slag and smaller particles, referred to as fines.

The gasification and scrubbing system 24 also may include a cooler, such as a radiant syngas cooler or a quench unit. Within the cooler, the syngas may be cooled and saturated, causing less desirable components to solidify. In particular, the molten slag may be rapidly cooled and solidified into coarse particles of slag 36 that may be discharged from the gasification and scrubbing system 24 and provided to a slag processing system 38. The slag processing system 38 may include equipment such as a lockhopper, a drag conveyor, and/or a slag sump, among others. Within the slag processing system 38, the slag 36 may be screened to reduce moisture and then directed to disposal offsite. For example, the slag 36 may be used as road base or as another building material.

In addition to producing slag 36, the gasification and scrubbing system 24 also may produce black water 40 that includes fine particles of slag. The black water 40 may be removed from the syngas within the quench unit and/or within a scrubber of the gasification and scrubbing system 24. In particular, within the scrubber, additional fines and other entrained gases, such as hydrogen chloride, may be removed. The black water 40 may be discharged from the gasification and scrubbing system 24 and directed to a black water processing system 42.

The black water processing system 42 may include equipment such as flash drums, settling tanks, and condensers, among others that function to separate dissolved gases and concentrate the fine particles. For example, the black water processing system 42 may include a series of flash drums that subject the black water 40 to a series of pressure reductions that may cause the black water 40 to be partially evaporated and cooled to remove dissolved gases 43. According to certain embodiments, the dissolved gases 43 may include syngas, which may be recovered in the gas cooling and treatment system 34. The black water processing system 42 also may include a settling process that produces separated fines 44 and grey water 45 that may be reused in the gasification and scrubbing system 24. The black water processing system 42 also may produce a portion of grey water, referred to as grey water blowdown 46, that is blown down for treatment to remove less desirable components. The separated fines 44 may be recycled to the feed stock preparation system 14 where the fines may be used to provide additional fuel.

The grey water blowdown 46 may be directed to a grey water treatment system 48 where the grey water blowdown 46 may undergo further processing to remove gases, such as ammonia, and solids to produce a treated discharge 50. As described further below with respect to FIG. 2, the grey water treatment system 48 may include equipment such as chemical reactors, clarifiers, filters, and strippers, that soften, clarify, and purify the grey water blowdown 46. The grey water treatment system 48 also may include bioreactors and membrane filtration units that remove organic materials and metals from the grey water blowdown 46. According to certain embodiments, the grey water treatment system 52 may include a biological reduction and precipitation biotreatment system that uses specially developed mixtures of naturally occurring microbes to chemically reduce and precipitate target components from the grey water 46 to produce the treated discharge 50. The treated discharge 50 may be sent to deep well injection, combined with another stream for discharge, or discharged to a body of water if the treated discharge 50 complies with environmental regulations and/or permit requirements.

In addition to producing slag 36 and black water 40, the gasification and scrubbing system 24 also produces scrubbed syngas 52. The scrubbed syngas 52 may be directed to the syngas cooling and treatment system 34 where the syngas may be further purified to produce sweetened syngas 54. The syngas cooling and treatment system 34 may also produce a syngas condensate 47 that may be employed in the gasification and scrubbing system 24 and/or the slag processing system 38. According to certain embodiments, the syngas cooling and treatment system 34 may include one or more water gas shift reactors that adjust the ratio of hydrogen to carbon monoxide in the scrubbed syngas 52. The syngas cooling and treatment system 34 also may include one or more acid gas removal processes that may remove acid gases, such as hydrogen sulfide and carbon dioxide, among others. Further, the syngas cooling and treatment system 34 may include one or more stripping processes for removing ammonia. Moreover, a tail gas treatment process also may be included to convert most of the residual sulfur compounds from upstream processing, such as from a sulfur recovery unit, to hydrogen sulfide.

The sweetened syngas 54 may be used to generate power within the power generation system 14. In particular, the sweetened syngas 54 may be directed to a combustor 56, where the sweetened syngas 54 may be combusted at a much higher efficiency than the original carbonaceous fuel fed into the feedstock preparation system 18. Air 57 also may be provided to the combustor 56 from a compressor 58 to mix with the sweetened syngas 54 in a fuel to air ratio that facilitates combustion of the sweetened syngas 54 to produce combustion gases 60. Nitrogen 32 may be provided to the combustor 56 from the air separator 28 via a diluent nitrogen compressor 62 to cool the combustion reaction.

The combustion gases 60 from the combustor 56 may be directed to a gas turbine 64, which may drive the compressor 58 and/or an electrical generator 66. Exhaust 68 from the gas turbine 64 may then be fed to a heat recovery steam generation (HRSG) system 70, which may recover heat from the exhaust 68 and from the steam 27 received from the gas cooling and treating system 34. The recovered heat may be used to generate steam 72 for driving a steam turbine 74, which in turn may drive a generator 76 to generate electricity.

Discharge steam 78 from the steam turbine 74 may be directed through a condenser 80 where the steam 78 may be condensed to provide condensed steam 82. To condense the steam 78, a cooling fluid 84, such as water, may be circulated through the condenser 80 from a cooling tower 86. The condensed steam 82 from the condenser 80 may then be recycled to the HRSG system 70 where the condensed steam 82 may again be heated to generate the steam 72 for the steam turbine 74.

As may be appreciated, the components of the IGCC system 10 are a simplified depiction and are not intended to be limiting. For example, in certain embodiments, additional equipment such as valves, temperature sensors, pressure sensors, controllers, and/or storage tanks, among others, may be included. Further, although the grey water treatment system 48 is described herein in the context of an IGCC system 10, the grey water treatment system 48 may be employed in other types of gasification systems. For example, the grey water treatment system 48 may be part of a separate gasification system 12 that may provide sweetened syngas 56 to a chemical plant for chemical production.

Figure 2:
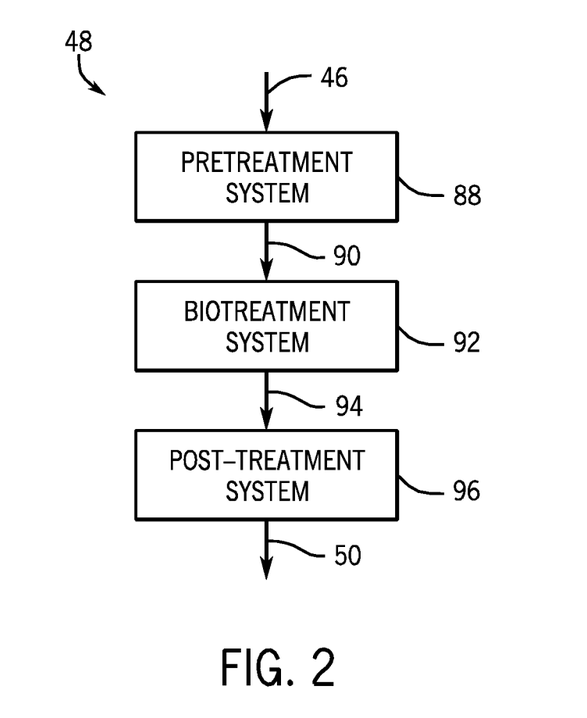
FIG. 2 is a schematic block diagram of an embodiment of the grey water treatment system of FIG. 1.

FIG. 2 is a schematic block diagram of an embodiment of the grey water treatment system 48 of FIG. 1. The grey water treatment system 48 includes a pretreatment system 88 that receives the grey water blowdown 46 from the black water processing system 42 (FIG. 1). Within the pretreatment system 88, the grey water blowdown 46 may be treated to remove trace metals and scaling components that may cause scaling in downstream equipment. For example, the pretreatment system 88 may remove components such as silica, calcium, magnesium, aluminum, antimony, arsenic, cadmium, calcium, iron, manganese, and mercury, among others. According to certain embodiments, the pretreatment system 88 may include equipment such as reactors, clarifiers, and filters. The pretreatment system 88 also may include other equipment for preparing the grey water blowdown 46 for biological treatment. For example, the pretreatment system 88 may include one or more strippers for removing ammonia to concentrations amenable to biological treatment.

The pretreatment system 88 may produce pretreated grey water 90 that may be directed to a biotreatment system 92 that uses a biological treatment process to chemically reduce and precipitate target components from the grey water. In particular, the biotreatment system 92 may employ specially designed mixtures of naturally occurring microbes to chemically reduce and precipitate the target components. Rather than organic components, the target components may include metals, metalloids, and/or inorganic nonmetallic components. The biotreatment system 92 also may employ the naturally occurring microbes to convert the target components into chemical components that may be discharged as a gas. For example, the microbes may convert nitrates into nitrogen gas.

The biotreatment system 92 also may include other equipment for preparing the pretreated grey water 90 for the biological reduction and precipitation process. For example, the biotreatment system 92 may include one or more oxidation reactors that oxidize components, such as selenium species to prepare them for the biological reduction. Within the biological reduction and precipitation biotreatment system 92, components, such as selenium, arsenic, mercury, molybdenum, nitrates, and vanadium may be removed to produce biotreated grey water 94.

The biotreated grey water 94 may be directed to a post-treatment system 96. The post-treatment system 96 may include one or more membrane bioreactors for removing organic components from the biotreated grey water 94. According to certain embodiments, the membrane bioreactors may remove organic components provided as nutrients for the microbes in the biotreatment system 92. The post-treatment system 96 also may include equipment such as reverse osmosis and ion exchange equipment designed to further lower the levels of the target components and/or to remove other undesirable components from the biotreated grey water 94. A treated discharge 50 may exit the post-treatment system 96 and may be sent to deep well injection, or to an existing water source through an outfall, depending on the components present in the treated discharge 50. Further, in other embodiments, the treated discharge 50 may be combined with another stream, for example, a chemical processing stream in a polymer plant, to undergo further treatment.

Figure 3:
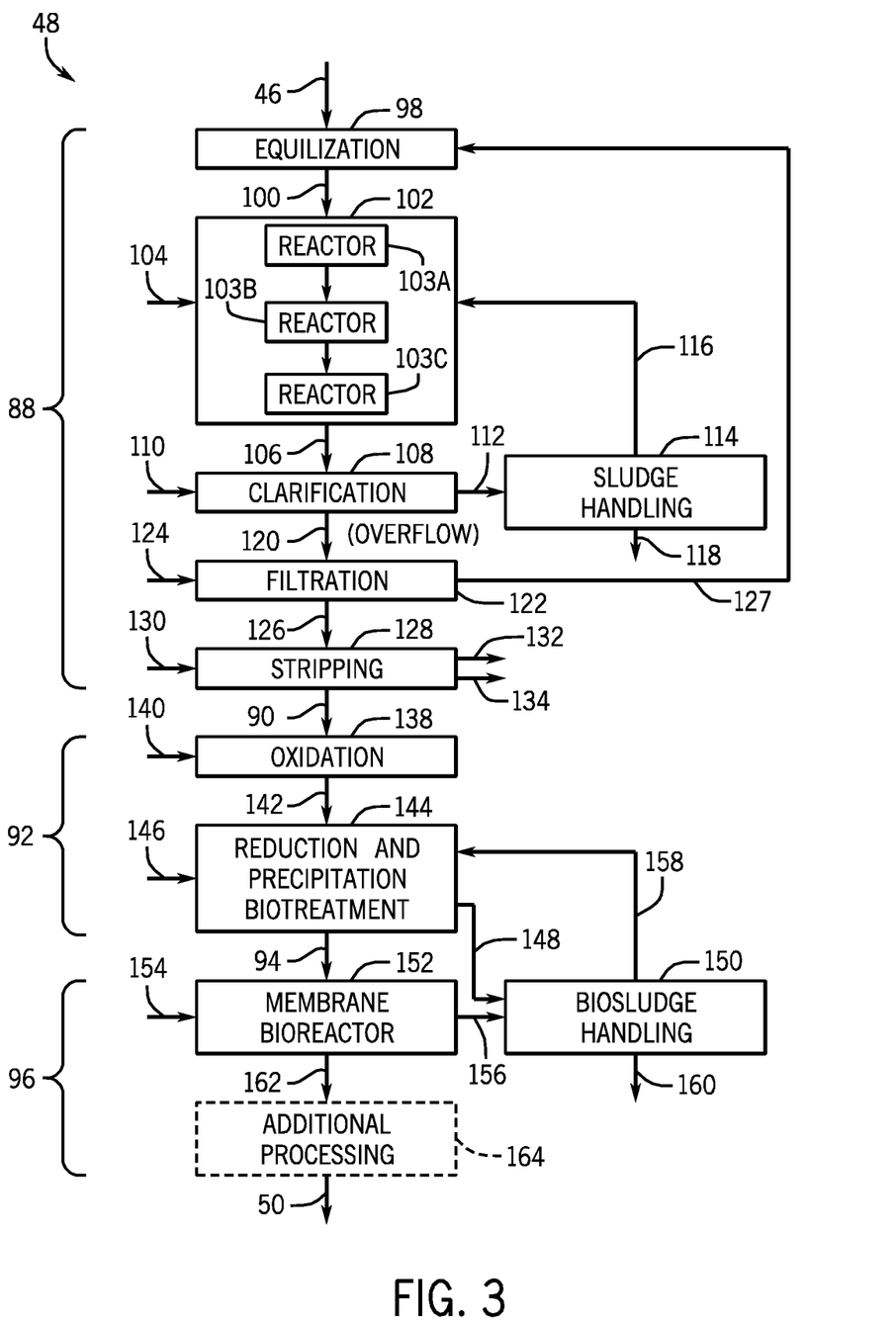
FIG. 3 is a detailed schematic block diagram of the grey water treatment system of FIG. 2.

FIG. 3 is a more detailed schematic flow diagram of the grey water treatment system 48. The grey water 46 may enter the pretreatment system 88 through an equalization system 98. The equalization system 98 may include one or more equalization tanks that provide steady state flow of a grey water feed stream 100 to a reaction system 102. The equalization tanks also may provide a collection point for recycle flows from downstream equipment while allowing the flow of the grey water feed stream 100 to be regulated. Further, if needed, chemicals may be provided to the equalization tanks to adjust the pH of the grey water feed stream 100.

The grey water feed stream 100 from the equalization system 98 may be provided to the reaction system 102 for removal of metals and/or scaling components. In particular, the reaction system 102 may include one or more chemical reactors 103 that react chemicals 104 with the grey water feed stream 100 to precipitate metals and/or scaling components. According to certain embodiments, the reaction system 102 may include three reactors 103 in series, each with top-mounted agitators designed to re-suspend solids. However, in other embodiments any suitable type and/or number of reactors 103 may be included in series and/or in parallel.

In embodiments employing three reactors 103, the reaction system 102 may include a first reactor 103A where the grey water feed stream 100 may undergo warm lime softening. In particular, hydrated limes may be added as chemicals 104 to the reactor to precipitate noncarbonate hardness components (i.e. sulfates and chloride salts). Further, heat may be provided to decrease the solubility of components such as calcium, magnesium, and silica. Sodium hydroxide and magnesium hydroxide also may be added to the first reactor to reduce dissolved silica. For example, silica may react with magnesium hydroxide to aid in the removal of silica in downstream reactors 103B and 103C.

From the first reactor 103A, the grey water may enter a second reactor 103B where further chemicals 104 may be added to further reduce the hardness to low concentrations, to reduce the potential for magnesium and calcium scale formation, and to precipitate heavy metal sulfides. For example, sodium carbonate may be added to prevent the formation of magnesium sulfate and calcium sulfate. Sodium bisulphate also may be added to form heavy metal sulfides, which may be precipitated and removed during a subsequent clarification step. Further, lime and/or magnesium may be added to remove additional hardness and silica.

From the second reactor 103B, the grey water may flow to a third reactor 103C where additional chemicals 104 may be added to remove additional hardness and heavy metals. For example, a solution of a precipitating agent, such as MetClear™ commercially available from General Electric Water and Process Technologies of Trevose, Pa., may be added to precipitate mercury sulfide particles. Ferric chloride also may be added to co-precipitate with calcium hydroxide and magnesium hydroxide. Further, the ferric chloride may act as a coagulant and may aid in settling of the precipitated particles. Further, coagulation may assist in the formation of larger particles through flocculation. The third reactor 103C also may provide additional residence time for soda ash softening and heavy metal polishing.

From the reaction system 102, a feed stream 106 may be directed to a clarification system 108 where the precipitated solids may be removed. The clarification system 108 may include distribution equipment, such as a splitter box, that separate the flow equally among several clarifiers included within the clarification system 108. Polymer 110 may be added to the splitter box to aid in the separation of solids in the clarifiers. According to certain embodiments, the clarification system 108 may include two solid contact clarifiers that soften the grey water by settling precipitants formed in the reaction system 102. Within the clarifiers, a sludge blanket may be formed that allows for additional coagulation of the solid particles. In certain embodiments, the clarifiers may include a bottoms rake that provides motion for flocculation. Further, the clarifiers may provide additional residence time for the separation of metal hydroxides and metal sulfides.

Solids 112 concentrated in the clarification system 108 may be directed to a sludge handling system 114 where the solids 112 may be dewatered. The sludge handling system 114 may include equipment, such as a thickener, where the solids may be further concentrated before being fed to filter presses included within the sludge handling system 114. According to certain embodiments, the thickener may be a metal sludge thickener that provides additional settling time. In certain embodiments, polymer may be added to the sludge handling system 114 to chemically condition the solids for the subsequent pressure filtration.

From the thickener, the solids 112 may be directed to filter presses, such as fixed volume, recessed plate filter presses, where the solids 112 may undergo pressure filtration. According to certain embodiments, the solids 112 may be pressurized for a period of time, such as one to three hours, to dewater the solids 112. The filter presses may reduce the volume of the sludge by removing liquid 116 that may be returned to the reaction system 102. The remaining solids may be discharged from the sludge handling system 114 as sludge 118.

A grey water feed stream 120 from the clarification system 108 may be directed to a filtration system 122 for further removal of the suspended solids formed in the reaction system 102 and the clarification system 108. The filtration system 122 may include one or more multimedia pressure filters that remove suspended particulates as the grey water flows through a filter bed of granular or compressible filter media. The removal of the particulates in the filtration system 122 may impede plugging of downstream components, such as sieve trays included within a downstream stripper. Hydrochloric acid 124 may be added to the filtration system 122 to prevent scaling.

According to certain embodiments, the filtration system 122 may include down flow filtration units housing multimedia filters (MMF) that contain multiple layers to enhance the capture of particulates. For example, the filtration units may include four layers of filter media with a gravel drain bed underneath where each layer picks up smaller particles than the preceding layer. According to certain embodiments, the layers may include an anthracite layer, a quartz layer, a sand layer, and a garnet layer disposed over a gravel drain bed layer. The filtration system 122 may produce filtered grey water 126 that enters a stripping system 128. Further, in certain embodiments, a portion of the filtered grey water 126 may be returned to the filtration system 122 and used as backwash to clean the filters. The spent backwash 127 may be returned to the equalization system 98 for further separation.

Within the stripping system 128, ammonia may be removed from the filtered grey water 126 to produce the pretreated grey water 90 that enters the biotreatment system 92. According to certain embodiments, the stripping system 128 may include a tray column ammonia stripper that removes ammonia 132 as a gas. Steam 130 may be provided to heat the grey water 90 and provide the driving force for vaporization and separation of the ammonia from the filtered grey water 126. The ammonia 132 may be sent to a sulfur recovery unit within the gas cooling and treatment system 34 (FIG. 1). Condensed steam 134 may exit the stripping system, and, in certain embodiments, may be provided to the sludge handling system 114 for filter press cake washing. The The pretreated grey water 90 from the pretreatment system 88 may enter the biotreatment system 92 where target components may undergo a valence reduction within bioreactors to allow subsequent precipitation of the target components. In particular, the pretreated grey water 90 may exit the stripping system 128 and may be sent to an oxidation system 138 where certain components, such as selenium, may be oxidized so that they may be removed in the biotreatment process. According to certain embodiments, the oxidation system 138 may include one or more oxidation reactors where chemicals 140, such as hypochlorite, chlorine dioxide, permanganate, and/or peroxide may be added to oxidize the selenium and produce an oxidized feed stream 142. For example, selenium existing in the grey water as selenocyanate ions may be oxidized to selenate or selenite for removal in the biotreatment process.

The oxidized feed stream 142 may then be provided to the reduction and precipitation biotreatment system 144. Within the reduction and precipitation biotreatment system 144, bioreactors seeded with naturally occurring microbial cultures, such as pseudomonas sp., may be used to remove target inorganic, metallic, and/or metalloid components such as selenium, nitrates, selenium, arsenic, mercury, molybdenum, and vanadium, among others. According to certain embodiments, the reduction and precipitation biotreatment system 144 may include eight bioreactor trains, each with two bioreactor cells. Each bioreactor cell may include a mixture of microbes residing on a support media, such as granular activated carbon. The bioreactor cells may operate in a down flow mode where feed is introduced at the top of the cell through a distribution system and withdrawn through the bottom of the cell. The reduction and precipitation biotreatment system 144 also may include one or more heat exchangers that may heat the feed stream 142 prior to transmitting the feed stream to each bioreactor cell. According to certain embodiments, the reduction and precipitation biotreatment system 144 may be an ABMet® advanced biological metals removal process, commercially available from General Electric Water and Process Technologies.

Within the reduction and precipitation biotreatment system 144, the naturally occurring microbes may chemically reduce and precipitate the target components, which may be inorganic, metallic, and/or metalloid components. In other words, the reduction and precipitation biotreatment system 144 may not use the microbes to remove organic components, and instead may use the microbes to remove inorganic, metallic, and/or metalloid components. The microbes may be especially developed mixtures designed to reduce and precipitate the target components. Further, the microbes may convert certain components, such as nitrates, into other components, such as nitrogen, that may be released as a gas. Nutrients 146 may be provided to the reduction and precipitation biotreatment system 144 to provide a carbon food source for the microbes. According to certain embodiments, the nutrients 146 may be provided as a solution that is injected into the feed stream for each bioreactor cell. Formates within the grey water may act as a carbon food source for the microbes in addition to the nutrients 146 provided to the reduction and precipitation biotreatment system 144.

The target components may be reduced and precipitated as biosolids 148 within the reduction and precipitation biotreatment system 144. For example, selenium contained in selenite or selenate may be reduced and precipitated as elemental selenium. In another example, arsenic may be reduced and precipitated as arsenic sulfide. To remove the biosolids 148, the reduction and precipitation biotreatment system 144 may be flushed and/or degassed. Degassing may release the target components converted to gases, such as nitrogen gas, while flushing may release the accumulated biomass and suspended solids within the reduction and precipitation biotreatment system 144. The released biosolids 148 may be directed to a biosludge handling system 150 that may be part of the post-treatment system 96.

The biotreated grey water 94 from the reduction and precipitation biotreatment system 144 may enter the post-treatment system 96. The post-treatment system 96 may further treat the biotreated grey water 94 to removed additional components from the grey water to allow the grey water to be sent to deep well injection, discharged to other streams, or discharged through an outfall in compliance with environmental regulations.

The post-treatment system 96 may include a membrane bioreactor system 152 that removes organics, total suspended solids (TSS), potential residual ammonia, and heavy metals, such as iron and manganese. According to certain embodiments, the membrane bioreactor system 152 may be a ZeeWeed membrane bioreactor (MBR), commercially available from the General Electric Company. The membrane bioreactor system 152 includes a bioreactor integrated with a membrane filtration unit. The bioreactor may be a suspended growth reactor that includes a pre-anoxic portion and an aerobic portion for degrading organic content within the grey water. The membrane filtration unit may include a reinforced hollow fiber membrane that separates the liquid and solid components. The membrane bioreactor system 152 may be continuously aerated with oxygen 154 using coarse or fine bubble diffusers and blowers for membrane scouring and/or to maintain appropriate oxygen levels.

The biosolids 156 from the membrane bioreactor system 152 may be directed to a biosludge handling system 150 for dewatering. A polymer may be added to the biosludge handling system 150 to chemically condition the biosolids 156 for pressure filtration within the biosludge handling system 150. According to certain embodiments, the biosludge handling system 150 may include a belt press filtration system. Within the biosludge handling system 150, the biosolids 156 may flow through a gravity drainage section where the biosolids 156 may thicken. After thickening, the biosolids 156 may flow to shear and compression sections of the belt press filtration system where the biosolids 156 may be compressed between two opposing porous cloths. Further, high-pressure compression may be used by passing the belt containing the biosolids 156 through two rollers. The biosludge handling system 150 may produce sludge 160 that may be scrapped from the belts by blades and sent to offsite disposal. Liquid 158 removed from the biosolids 156 may be recycled to the reduction and precipitation biotreatment system 144 for further treatment.

The grey water feed stream 162 exiting the membrane bioreactor system 152 may be directed to an optional additional processing system 164 where additional components may be removed from the grey water feed stream 162 to produce the treated discharge 50. According to certain embodiments, the additional processing system 164 may include a reverse osmosis system that further removes heavy metals. The additional processing system 164 also may include ion exchange systems that use softeners to remove heavy metals. Further, in certain embodiments, the additional processing system 164 may include other systems, such as a carbon adsorption system for mercury removal, a weak acid cation (WAC) system for removing hardness and heavy metals, a forced draft decarbonator (FDD) for removing carbon dioxide, or sodium cycle softeners, among others. However, in other embodiments, no additional processing may be employed and the grey water feed stream 162 may represent the treated discharge 50 that exits the grey water treatment system 48.

The treated discharge 50 may exit the grey water treatment system 48 and may be discharged through an outfall into an existing body of water in compliance with environmental regulations. In other embodiments, the treated discharge 50 may be sent to deep well injection or may be blended with another stream, for example, a wastewater stream in a polymer facility. Further, in some embodiments, a portion or all of the treated discharge 50 may be used as a make-up water to produce the fuel slurry 20 that is sent to the gasification and scrubbing system 24 (FIG. 1).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasification and scrubbing system configured to produce syngas and a black water from a fuel source;
   a black water treatment system coupled to the gasification and scrubbing system, wherein the black water treatment system is configured to treat the black water to produce a grey water; and
   a grey water treatment system coupled to the black water treatment system and configured to receive the grey water, wherein the grey water treatment system comprises:
      an oxidation reactor configured to oxidize the grey water using a chemical oxidant to produce an oxidized grey water; and
      a biological reduction and precipitation biotreatment system comprising microbes configured to remove one or more target components from the oxidized grey water.

2. The system of claim 1, wherein the microbes are configured to chemically reduce and precipitate the one or more target components.

3. The system of claim 1, wherein the one or more target components comprise selenium.

4. The system of claim 1, wherein the one or more target components comprise at least one of selenium, arsenic, mercury, molybdenum, nitrate, and vanadium.

5. The system of claim 1, wherein the microbes are configured to convert nitrate into nitrogen gas.

6. The system of claim 1, wherein the biological reduction and precipitation biotreatment system comprises bioreactor cells containing the microbes on granular carbon.

7. The system of claim 1, wherein the oxidation reactor is configured to oxidize selenium within the grey water.

8. The system of claim 1, wherein the biological reduction and precipitation biotreatment system does not use the microbes to remove organic components from the grey water.

9. A system, comprising:
   a gasification and scrubbing system configured to produce syngas and a black water from a fuel source;
   a black water treatment system coupled to the gasification and scrubbing system, wherein the black water treatment system is configured to treat the black water to produce a grey water; and
   a grey water treatment system coupled to the black water treatment system and configured to receive the grey water, wherein the grey water treatment system comprises:
      an oxidation reactor configured to oxidize selenium species within the grey water using a chemical oxidant; and
      a biological reduction and precipitation biotreatment system comprising microbes configured to reduce the oxidized selenium species to produce a reduced selenium species, and the biological reduction and precipitation biotreatment system is configured to precipitate the reduced selenium species.

10. The system of claim 9, wherein the biological reduction and precipitation biotreatment system comprises a plurality of bioreactor cells containing the microbes residing on granular carbon.

11. The system of claim 10, wherein the biological reduction and precipitation biotreatment system comprises a plurality of bioreactor trains, each with two bioreactor cells of the plurality of bioreactor cells.

12. The system of claim 9, wherein the microbes are configured to convert nitrate into nitrogen gas.

13. The system of claim 9, wherein the microbes are configured to chemically reduce and precipitate arsenic as arsenic sulfide.

14. The system of claim 9, wherein the grey water treatment system comprises a pretreatment system disposed upstream of the oxidation reactor, and the pretreatment system is configured to remove scaling components from the grey water.

15. A system, comprising:
   a gasification and scrubbing system configured to produce syngas and a black water from a fuel source;
   a black water treatment system coupled to the gasification and scrubbing system, wherein the black water treatment system is configured to treat the black water to produce a grey water; and
   a grey water treatment system coupled to the black water treatment system and configured to receive the grey water, wherein the grey water treatment system comprises:
      a pretreatment system configured to remove scaling components from the grey water to produce a pretreated grey water; and
      a biotreatment system comprising one or more oxidation reactors configured to oxidize the pretreated grey water and one or more biological reduction and precipitation bioreactors configured to remove on or more target components from the oxidized pretreated grey water to produce biotreated grey water.

16. The system of claim 15, wherein the pretreatment system comprises one or more chemical reactors and one or more clarifiers configured to soften the grey water.

17. The system of claim 15, wherein the pretreatment system comprises one or more filtration systems configured to remove suspended solids from the grey water.

18. The system of claim 15, wherein the pretreatment system comprises a stripper configured to remove ammonia from the grey water.

19. The system of claim 15, wherein the grey water treatment system comprises a membrane biotreatment reactor disposed downstream of the biotreatment system, and the membrane biotreatment reactor is configured to remove one or more organic components from the biotreated grey water.

20. The system of claim 19, wherein the membrane biotreatment reactor comprises a pre-anoxic reactor, an aerobic reactor, and a filtration membrane.

21. The system of claim 15, wherein the grey water treatment system is part of an integrated combined cycle system.

22. A method, comprising:
   generating syngas and a black water in a gasification and scrubbing system;
   treating the black water in a black water treatment system to produce a grey water;
   receiving the grey water from the black water treatment system;
   oxidizing at least a selenium species within the grey water to produce an oxidized selenium species using an oxidation reactor;

reducing the oxidized selenium species within the grey water to produce a reduced selenium species using a biological reduction and precipitation biotreatment system; and removing at least the reduced selenium species from the grey water using the biological reduction and precipitation biotreatment system.

23. The method of claim 22, wherein the oxidized selenium species comprises a selenate, a selenite, or a combination thereof.

* * * * *